(12) United States Patent
Ando

(10) Patent No.: US 6,477,719 B1
(45) Date of Patent: Nov. 12, 2002

(54) LOW TANK OF FLUSH TOILET

(76) Inventor: Katsuji Ando, 2145-36, Kume, Tokorozawa-city, Saitama 359-1131 (JP)

( * ) Notice: Subject to any disclaimer, the term of this patent is extended or adjusted under 35 U.S.C. 154(b) by 0 days.

(21) Appl. No.: 09/889,880

(22) PCT Filed: Nov. 15, 2000

(86) PCT No.: PCT/JP00/08039

§ 371 (c)(1),
(2), (4) Date: Jul. 24, 2001

(87) PCT Pub. No.: WO01/38653

PCT Pub. Date: May 31, 2001

(30) Foreign Application Priority Data

Nov. 24, 1999 (JP) ............................. 11-374549

(51) Int. Cl.[7] .................................................. E03D 1/00
(52) U.S. Cl. ............................. 4/353; 4/665; 137/595
(58) Field of Search ................... 4/665, 353; 137/595

(56) References Cited

U.S. PATENT DOCUMENTS 746,896 A * 12/1903 Stott ........................... 137/595
1,185,389 A * 5/1916 Ferrer ...................... 137/595 X
5,303,728 A    4/1994 Senatore
5,351,713 A   10/1994 Lin

FOREIGN PATENT DOCUMENTS

| JP | 50-85133 A | 7/1975 |
|---|---|---|
| JP | 53-134450 | 10/1978 |
| JP | 3048454 U | 5/1998 |

* cited by examiner

Primary Examiner—Charles E. Phillips
(74) Attorney, Agent, or Firm—Foley & Lardner

(57) ABSTRACT

A low tank of a flush toilet capable of receiving either of clean water and recycling water, wherein two sets of ball taps are fixed into the low tank, two sets of ball valves are connected directly to the inlet sides of the ball taps, and a lever handle is changed from 0 to 90 degree by a changeover lever capable of alternately switching between the two sets of ball valves, whereby the two sets of ball valve shafts are rotated so that the opening and closing operation can be performed simultaneously in the ball valves.

2 Claims, 2 Drawing Sheets

LOW TANK OF FLUSH TOILET

TECHNICAL FIELD

The present invention relates to a low tank of a flush toilet capable of receiving either of clean water and recycling water through two separate pipes connected to the low tank.

BACKGROUND ART

The conventional flush toilet system as disclosed in Japanese Patent Application No. 11-256075 wherein a switching device is introduced to the inlet side of the low tank of a flush toilet so that switching between tap water and rain water may be achieved as needed is problematic because of its incorporating a single set of ball tap for receiving water in the low tank, that is, the ball tap being shared with tap water and rain water. In view of this, the present invention aims at providing a low tank of a flush toilet wherein two sets of ball taps are introduced in the low tank to separately control the entry of clean water or recycling water into the tank, in such a manner as to allow the user to freely choose, after use, clean water or recycling water to be fed into the low tank simply by operating on a single changeover lever.

DISCLOSURE OF THE INVENTION

According to this invention, two sets of ball taps are introduced in a low tank of a flush toilet; two sets of ball valves are directly connected to the inlet sides of the ball taps; and a changeover lever capable of alternately switching between the two sets of ball valves is provided so that the opening and closing operation can be performed simultaneously in the ball valves, thereby activating either of the two valves for the passage of appropriate water.

BEST MODE FOR CARRYING OUT THE INVENTION

For the detailed illustration of this invention, this invention will be described according to the attached figures.

Figure 1:
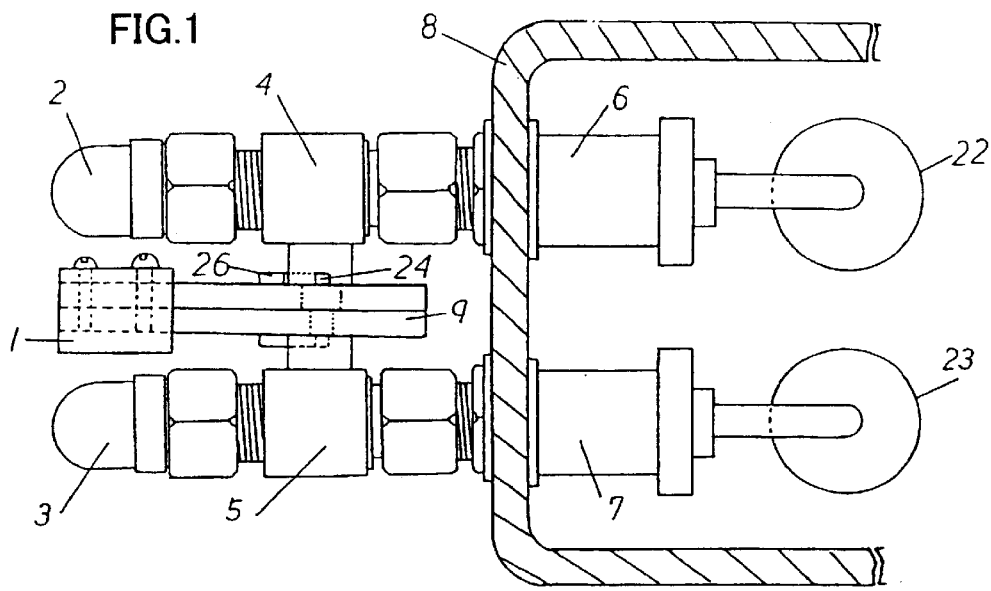
FIG. 1 is a flat view of a low tank to which ball valves and ball taps are attached.

FIG. 1 gives a flat view of a low tank to which ball valves and ball taps are attached: inside a low tank 8 fixed are two sets of ball taps, a ball tap 6 for clean water and a ball tap 7 for recycling water; and two sets of ball valves, a ball valve 4 for clean water and a ball valve 5 for recycling water are directly connected to the inlet sides of the ball taps.

A connecting pipe 2 for clean water is directly connected to the inlet side of ball valve 4 for clean water while a connecting pipe 3 for recycling water is directly connected to the inlet side of ball valve 5 for recycling water.

Rotating shafts 16 and 17 respectively for ball valves 4 and 5 for clean water and recycling water are fixed facing to each other.

Figure 2:
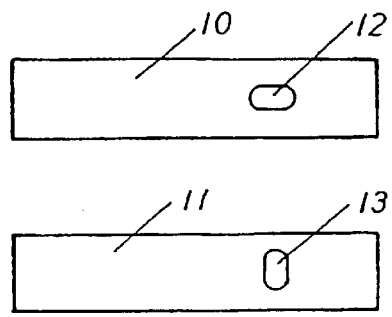
FIG. 2 is a view of a changeover lever disintegrated for illustration.

FIG. 2 is a view of a changeover lever disintegrated for illustration.

A changeover lever element A10 has a horizontal, oblong slit 12 while a changeover lever element B11 has a vertical, oblong slit 13. The two lever elements are combined to form a compound lever 9 wherein the two slits are positioned relative to each other so as to give a cross-shaped opening.

Figure 3:
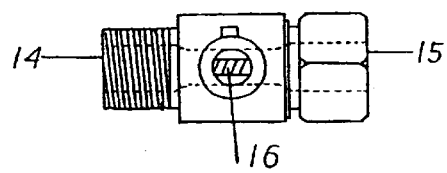
FIG. 3 is a view of a ball valve with its inlet and outlet kept open.

FIG. 3 is a view of a ball valve with its inlet and outlet kept open.

The passage through the ball valve from its inlet side 14 to its outlet side 15 is kept open. This is because, as long as the rotating shaft 16 for the ball valve is positioned horizontal, the ball valve is opened.

Figure 4:
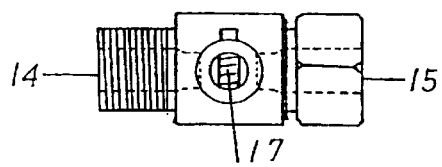
FIG. 4 is a view of a ball valve with its inlet and outlet kept closed.

FIG. 4 is a view of a ball valve with its inlet and outlet kept closed.

When the rotation shaft 17 for the ball valve stands upright, that is, is positioned vertically, the passage through the valve from its inlet 14 to its outlet 15 is closed. Namely, as long as the rotating shaft 17 for the ball valve is positioned vertically, the ball valve is closed.

Figure 5:
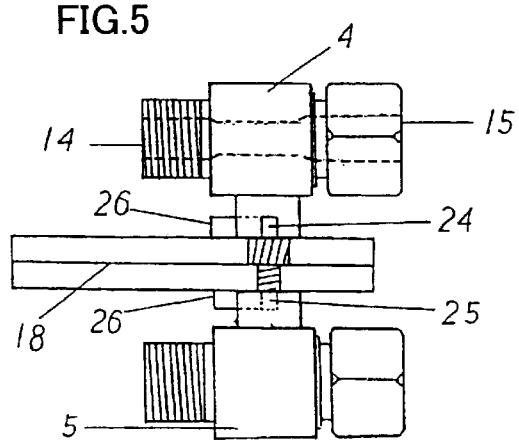
FIG. 5 is a view of the ball valve for clean water being kept open while a changeover lever is positioned horizontally.

FIG. 5 is a view of the ball valve for clean water which is kept open while a changeover lever is positioned horizontally.

To keep the compound lever 9 horizontal, a lever stopper 26 strikes against a ball valve stopper 25 for recycling water to be held there in a horizontal position.

Figure 6:
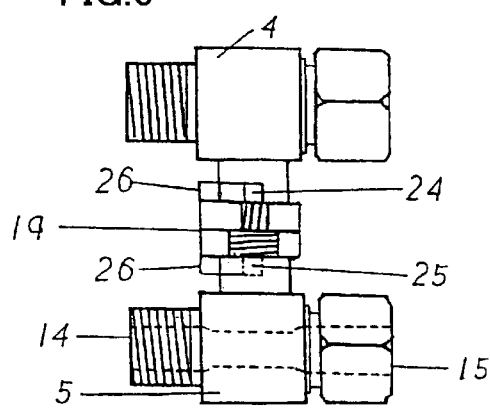
FIG. 6 a view of the ball valve for recycling water being kept open while the changeover lever is positioned vertically.

FIG. 6 is a view of the ball valve for recycling water which is kept open while the changeover lever is positioned vertically.

To keep the compound lever 9 vertical, the lever stopper 26 strikes against a ball valve stopper 24 for clean water to be held there in a vertical position.

As shown in FIG. 5, as long as the compound lever 9 is positioned horizontally, the ball valve 4 for clean water is kept open, while the ball valve 5 for recycling water on the opposite side is kept closed.

As shown in FIG. 6, as long as the compound lever 9 is positioned vertically, the ball valve 5 for recycling water is kept open while the ball valve 4 for clean water on the opposite side is kept closed.

Figure 7:
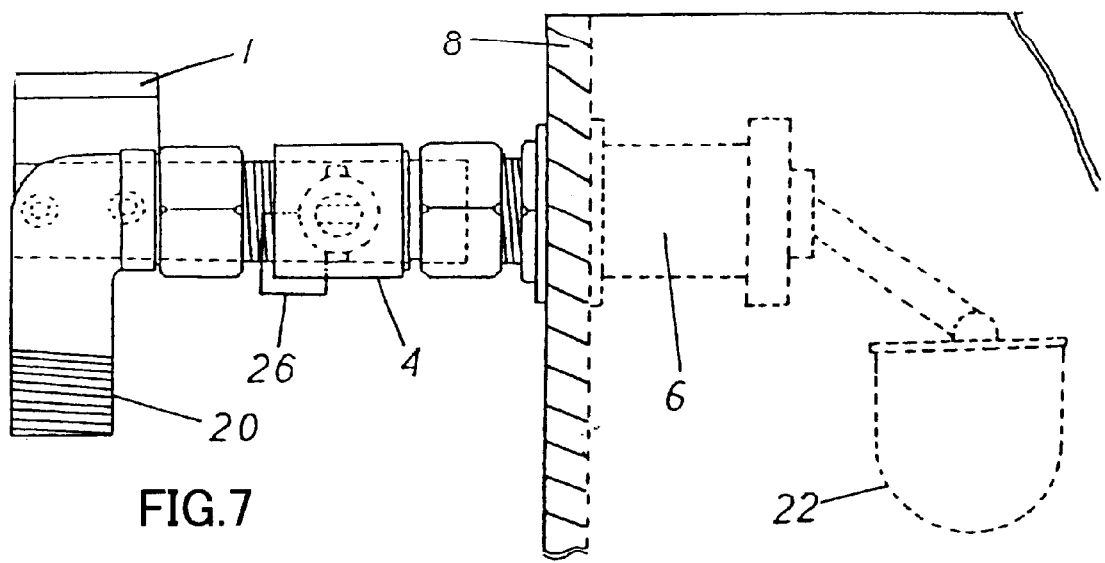
FIG. 7 is a lateral view of the ball valve for clean water kept open.

FIG. 7 is a lateral view of the ball valve for clean water kept open.

This figure shows the changeover lever 1 being positioned horizontally: the ball valve 4 for clean water is opened and feeding of water to the ball tap 6 for clean water becomes possible. A ball float 22 for clean water is introduced in the low tank to enable the ball tap 6 for clean water to be repeatedly opened and closed.

Figure 8:
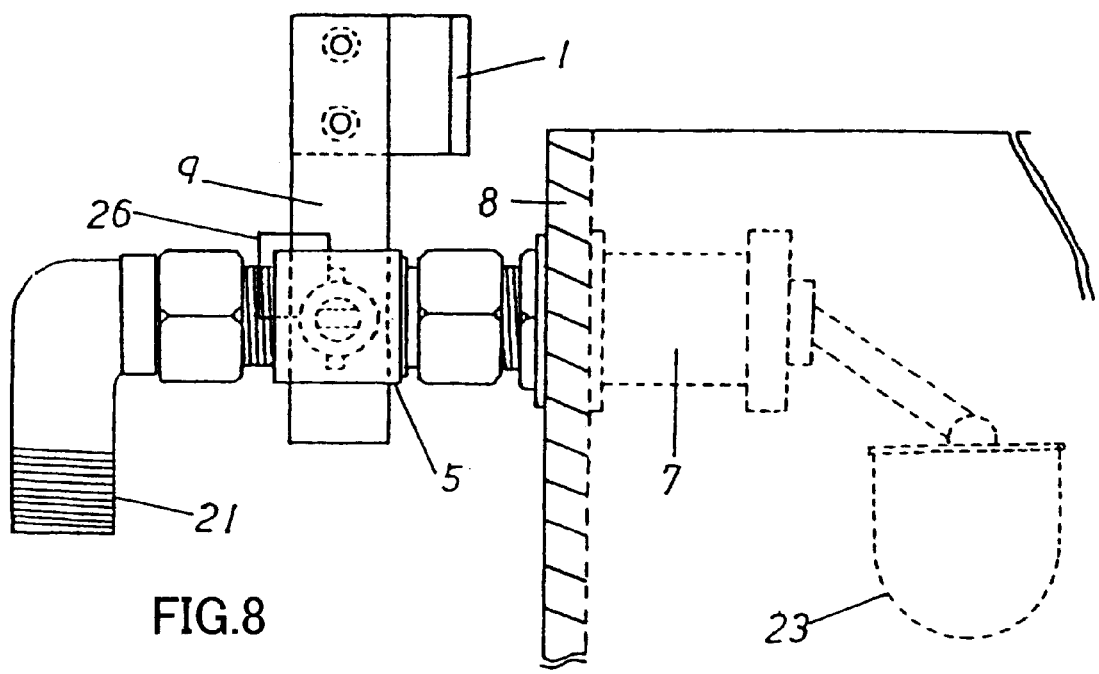
FIG. 8 is a lateral view of the ball valve for recycling water kept open.

FIG. 8 is a lateral view of the ball valve for recycling water kept open.

This figure shows the changeover lever 1 being positioned vertically: the ball valve 5 for recycling water is opened and feeding of water to the ball tap 7 for recycling water becomes possible. A ball float 23 for recycling water is introduced in the low tank to enable the ball tap 7 for recycling water to be repeatedly opened and closed.

Industrial Applicability

As described above, the low tank of a flush toilet of this invention allows one to feed water from either of two different water sources comprising clean water and recycling water as flush water, by simply operating on a single changeover lever capable of alternately switching between the two sets of ball valves whereby it is possible to activate one ball valve while inactivating the other, and vice versa.

What is claimed is:

1. A low tank of a flush toilet comprising:

two sets of ball taps fixed into the low tank;

two sets of ball valves directly connected to the inlet sides of the ball taps; and a single changeover lever for alternately switching between the two sets of ball valves provided such that the opening and closing operation is performed simultaneously in the ball valves, and for allowing water to be fed to a selected one of the ball taps.

2. A low tank of a flush toilet comprising:

a first ball tap for recycled water by which an inflow of recycled water is allowed;

a second ball tap for clean water by which an inflow of clean water is allowed;

a first ball valve for recycled water by which opening and closing of an inlet side of the first ball tap for recycled water is allowed;

a second ball valve for clean water by which opening and closing of an inlet side of the second ball tap for clean water is allowed, wherein recycled water is fed from the first ball tap for recycled water when first the ball valve for recycled water is open, while clean water is fed from the second ball tap for clean water when the second ball valve for clean water is open; and a single changeover lever which is operatively connected with the first and second ball valves for opening and closing the first ball valve for recycled water and the second ball valve for clean water, respectively, wherein one of the first and second ball valves is kept opened while the other of the first and second ball valves is kept closed depending on the operation of the changeover lever.

* * * * *